United States Patent [19]

Fukumoto et al.

[11] Patent Number: 4,910,530

[45] Date of Patent: Mar. 20, 1990

[54] THERMAL TRANSCRIPTION PRINTER

[75] Inventors: Hiroshi Fukumoto; Koji Namura, both of Amagasaki; Kenichi Naruki; Ryuzo Une, both of Fukuyama, all of Japan

[73] Assignee: Mitsubishi Denki Kabushiki Kaisha, Tokyo, Japan

[21] Appl. No.: 226,826

[22] Filed: Aug. 1, 1988

[30] Foreign Application Priority Data

Aug. 8, 1987 [JP] Japan .......... 62-198561

Aug. 8, 1987 [JP] Japan .......... 62-198562

[51] Int. Cl.[4] .......... G01D 15/10; G01D 15/24; G03G 15/00

[52] U.S. Cl. .......... 346/76 PH; 346/134; 355/309

[58] Field of Search .......... 346/76 PH, 134; 355/14 SH, 3 SH; 74/66S F; 400/120

[56] References Cited

U.S. PATENT DOCUMENTS 4,547,783 10/1985 Watanabe .

4,552,470 11/1985 Yana .......... 400/120

4,642,659 2/1987 Nagashima .......... 346/76 PH 4,698,650 10/1987 Watanabe .......... 346/134

FOREIGN PATENT DOCUMENTS 61-237668 10/1986 Japan .

62-144975 6/1987 Japan .

62-144976 6/1987 Japan .

*Primary Examiner*—E. A. Goldberg

*Assistant Examiner*—Scott A. Rogers

*Attorney, Agent, or Firm*—Sughrue, Mion, Zinn, Macpeak & Seas

[57] ABSTRACT

A thermal transcription printer has a thermal head (8), a platen (9), a pair of pinch rollers (10), (11) disposed on both sides of the platen and a gearing apparatus consisting of gears (31), (32) and (33) and oneway clutches (29) and (30) and the gearing apparatus over-drives or reduces the rotation speed of the pinch rollers (10) and (11) and coupling of the oneway clutches and the gears is selected for making peripheral velocity of a pinch roller at a forward position against the paper conveyance faster than that at a backward position.

4 Claims, 14 Drawing Sheets

THERMAL TRANSCRIPTION PRINTER

FIELD OF THE INVENTION AND RELATED ART STATEMENT

1. Field of the Invention

The present invention relates to a thermal transcription printer in which ink on a ribbon is transcribed to a paper sheet to be recorded an image or the like by heating of a thermal head, and especially relates to a thermal transcription printer which repeats transcription of images a plurality times on the same area by reciprocation of the paper.

2. Description of the Related Art

FIG. 19 shows a conventional thermal transcription printer, for example, shown in Japanese published unexamined patent application Sho 60-72773. In FIG. 19, a paper sheet 3 contained in a cassette 2, which is removably fitted with a body 1, is supplied one by one to a platen 9 by rotation of paper supplying rollers 4 (for simplifying the illustration, only one supply roller 4 is schematically shown in the figure). A ribbon 7 which is to be thermally transcribed to the paper sheet 3 is supplied from a supplying spool 5 to a withdrawing spool 6. A thermal head 8 is moved up and down by magnetic energy of a magnet 12. One or more insertion pinch rollers 11 disposed on an insertion portion of the platen 9 and one or more ejection pinch rollers 10 disposed on an ejection portion of the platen 9 are respectively pressed on a surface of the platen 9 by springs (not shown in the figure) and rotated by the rotation of the platen 9 (only one of the pinch rollers 10 and 11 are schematically shown for simplifying the figure). An friction member 13 and brake 14 are disposed above the insertion pinch roller 11. Aligning rollers 15 and 16 are also disposed above the insertion pinch roller 11. Ejection roller 17, ejection pinch roller 18 and a pair of ejection paper guides 24 and 25 are disposed above the ejection pinch roller 10. Only one of the ejection rollers 17 and ejection pinch rollers 18 are schematically shown in the figure for simplification. At the bottom of the ejection paper guides 24 and 25, a sensor 19 for detecting the top of the paper sheet 3 is disposed. The paper sheet 3 supplied from the cassette 2 is guided by paper guides 20 and 21. A stacker 26, a power supply 27 and control circuit substrates 28 are also disposed on the body 1.

A paper sheet 3 which is supplied from the cassette 2 passes a space between the paper guides 20 and 21, forwarded by the rotation of the aligning rollers 15 and 16 and inserted to a space between the platen 9 and the insertion pinch roller 11. Thereafter, the paper sheet 3 passes between the platen 9 and the ejection pinch roller 10 being sandwiched by the platen 9 and the ribbon 7, and reaches a position facing to the sensor 19.

When the sensor 19 detects the top of the paper sheet 3, the magnet 12 is excited to push the thermal head 8 to the platen 9, sandwiching the paper sheet 3 and the ribbon 7 therebetween. By supplying electric signals to the thermal head 8, selected parts of ink on the ribbon 7 at reception of heat from the thermal head 8, and an image to be formed is transcribed to the paper sheet 3. When the transcription of the image to the paper sheet 3 is completed, the thermal head 8 is removed from the platen 9 by stopping the excitation of the magnet 12, and the paper sheet 3 is conveyed backward to the position facing the sensor 19, by rotation of the platen 9 and the pinch rollers 10 and 11.

The used part of the ribbon 7 is wound by the withdrawing spool 6, and then a ribbon 7 of another color is superposed to the paper sheet 3 and the transcription of image of said another color is made on the paper sheet 3 by the same process. After repeating the above-mentioned transcription process in necessary number of times for various colors, the paper sheet 3 is ejected to the stacker 26.

As the conventional thermal transcription printer is constituted as mentioned above, speed difference is often made between different parts of driving means for the paper sheet 3. That is, the paper conveying speeds at an insertion part defined by the insertion pinch roller 11 and the platen 9 is different from the paper conveying speed at an ejection part defined by the ejection pinch roller 10 and the platen 9 during the reciprocation conveyances of the paper sheet 3. As a result, looseness or slippage of the paper sheet 3 between the part of insertion pinch roller 11 and the part of the ejection pinch roller 10 and of the position of the paper sheet 3 with regard to the rotation angle of the platen 9 occurs. Those disadvantages are the cause of the color breakup of the printed color images on the paper sheet 3.

Further, when the pressures of each pinch of the rollers is not uniform, the paper sheet 3 is conveyed obliquely. The obliqueness of the paper sheet 3 is different in forward and backward conveyances. As a result, the color breakup may occur.

Furthermore, in forward conveyance of the paper sheet 3 (for transcription of the image) the thermal head 8 is pressed on the platen 9, while in backward conveyance of the paper sheet 3 the thermal head 8 is departed from the platen 9. Because the conditions of the paper conveyances in forward and backward directions are different from each other the above-mentioned misregistration is liable to occur.

OBJECT AND SUMMARY OF THE INVENTION

Accordingly, an object of the present invention is to provide an improved thermal transcription printer capable of solving the above-mentioned disadvantages associated with the conventional printer, wherein a paper is closely adhered to a platen both in forward and backward conveyances, and the paper is conveyed on a contacting surface of the platen without slippage therefrom.

A thermal transcription printer in accordance with the present invention comprises;

a thermal head for supplying heat energy to an ink ribbon pressed on a paper to be transcribed of an image;

a platen whereon said paper is to be wound and reciprocatively conveyed by clockwise and counterclockwise rotations thereof;

rotation transmitting means disposed on at least one side of a shaft of the platen;

a pair of pinch rollers for providing pressing forces on the insertion side and ejection side of the platen for pressing the paper to the platen;

pinch roller rotating means disposed on at least one side of the shafts of the respective pinch rollers and geared with the rotation transmitting means for rotating the pinch rollers in a manner such that the peripheral speed of the pinch rollers is faster than that of the platen; and oneway clutches disposed on the shafts of respective pinch rollers and coupled to the pinch roller rotating means in such a manner that one pinch roller at a backward position with respect to a conveyance direction of the paper is trailed to the platen and the other pinch roller at a forward position is over-driven at a faster speed than the peripheral speed of the platen.

Since the thermal transcription printer in accordance with the present invention is constituted as mentioned above, the paper conveyed forward and backward is closely adhered to the platen, and looseness or slippage from the platen is prevented. As a result, a color image is accurately and clearly transcribed to the paper without the occurrance of mis-registration.

DESCRIPTION OF THE PREFERRED EMBODIMENTS

Figure 1:
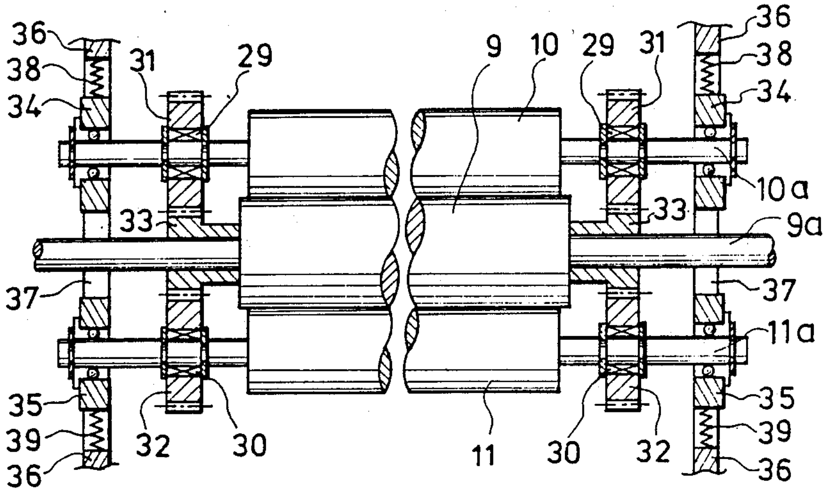
FIG. 1 is a plan view showing a main part of a preferred embodiment of a thermal transcription printer in accordance with the present invention.
Figure 2:
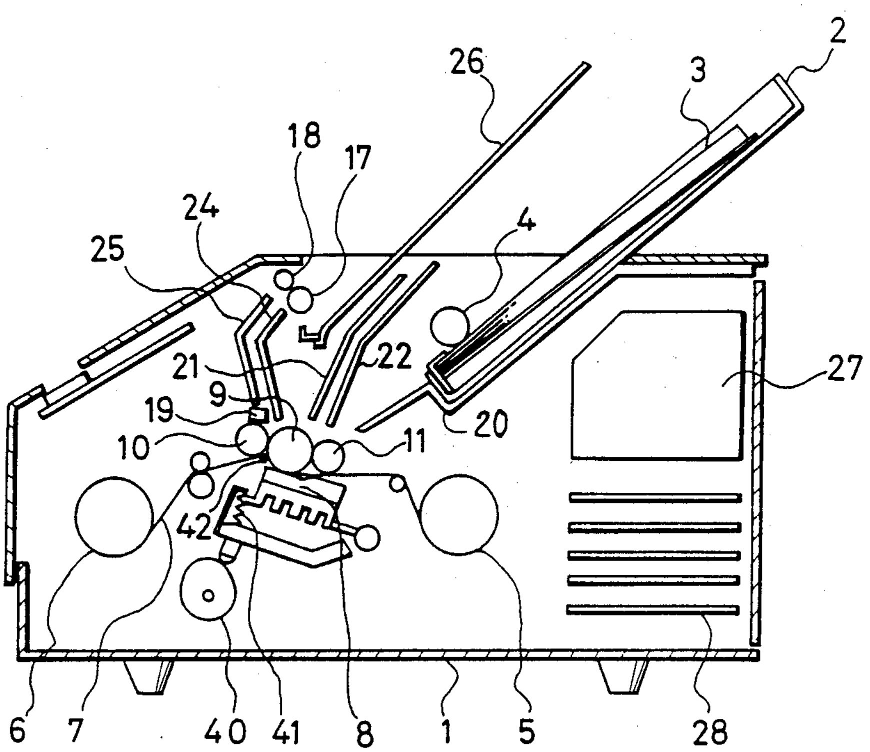
FIG. 2 is a cross-sectional side view showing the main part of the thermal transcription printer shown in FIG. 1.

A first preferred embodiment of a thermal transcription printer is described in reference to FIG. 1, FIG. 2 and FIG. 3(A).

FIG. 1 is a plan view showing the main part of the thermal transcription printer in accordance with the present invention. FIG. 2 is a cross-sectional side view of the thermal transcription printer shown in FIG. 1. FIG. 3(A) is a schematic side view showing a gearing of the first preferred embodiment of the thermal transcription printer shown in FIG. 1 and FIG. 2.

In FIG. 2, a cassette 2 for containing paper sheets 3 to which color image is to be transcribed is mounted on a body 1. The paper sheet 3 is supplied to an image transcription part by the rotation of paper supplying rollers 4. (In an actual apparatus, there are provided several rollers, but for simplifying the illustration, only one is schematically shown in the figure). A ribbon 7 which is to be thermally transcribed to the paper sheet 3 is supplied from a supplying spool 5 to a withdrawing spool 6. A thermal head 8 is moved up and down by a rotation of a head control cam 40 and contacts a platen 9. Pressure of the thermal head 8 to the platen 9 is supplied by a head pressing spring 41. A remover roller 42 is provided above the top surface of the thermal head 8 for removing the ribbon 7 from the thermal head 8 when the thermal head 8 is departed from the platen 9. A pair of pinch rollers 10 and 11 are provided on both sides (ejection part and insertion part) of the platen 9, which contact the platen 9 by pressures supplied from the springs 38 and 39 (shown in FIG. 1). Details are described afterward. A paper guide 20 is provided below the cassette 2 and between the cassette 2 and the insertion pinch roller 11. And also a pair of paper guides 21 and 22 are provided above the platen 9 and the insertion pinch roller 11. The paper sheet 3 from the cassette 2 is conveyed to the contact part of the platen 9 and the insertion pinch roller 11 and guided by the paper guides 20 and 22. Another pair of paper guides 24 and 25 are provided above the platen 9 and the ejection pinch roller 10. At the bottom end of the paper guide 24 or 25 is a sensor 19 for detecting whether the top end of the paper sheet 3 passes or reaches to a position facing the sensor 19 or not. An ejection roller 17 and a pinch roller 18 are provided above the top ends of the paper guides 24 and 25. Furthermore, a stacker 26 is disposed near the ejection roller 17 and above the platen 9. A power supply 27 and control circuit substrates 28 are disposed in the body 1.

In FIG. 1, oneway clutches 29 are provided on positions near the ends of a shaft 10*a* of the ejection pinch roller 10, and oneway clutches 30 are provided on positions near the ends of a shaft 11*a* of the insertion pinch roller 11. Gears 31 are coaxially fixed to a sliding member of the oneway clutches 29 and gears 32 are coaxially fixed to a sliding member of the oneway clutches 30. The gears 31 and 32 are also geared to gears 33 provided on a shaft 9*a* of the platen 9. A gearing apparatus constituted by gears 31, 32 and 33 represents an overdriving system as shown in FIG. 3(A). Further, bearing blocks 34 are provided on both ends of the shaft 10*a* of the ejection pinch roller 10, and bearing blocks 35 are provided on both ends of the shaft 11*a* of the insertion pinch roller 11. Such bearing blocks 34 and 35 slidably engage in guiding grooves 37 of side frames 36 and slide along the guide grooves 37.

The ejection pinch roller 10 is pressed to the platen 9 by pressure of the springs 38 which are applied to the bearing blocks 34. The insertion pinch roller 11 is also pressed to the platen 9 by pressure of the springs 39 which are applied to the bearing blocks 35.

Motion of the above-mentioned embodiment is as follows:

In FIG. 3(A), when the platen 9 rotates in a clockwise direction shown by arrow A, the gear 33 also rotates in a clockwise direction. The gears 31 and 32 geared to the gear 33 are respectively rotated in counterclockwise direction. At this time, the sliding member of oneway clutches 29 is fixed to the gears 31, and the ejection pinch roller 10 is over-driven (sped up) by the rotating force supplied by the gearing of gears 31 and 33. Accordingly, the peripheral velocity of the ejection pinch roller 10 is increased to a higher velocity, by the gear ratio of the gears 31 and 33, than that of the platen 9. On the other hand, the oneway clutches 30 is free from the gears 32. Therefore, the insertion pinch roller 11 is trailed to the platen 9 by friction between the insertion pinch roller 11 and the platen 9.

In opposition, when the platen 9 rotates in a counterclockwise direction shown by arrow B, sliding member of the oneway clutches 30 is fixed to gears 32 and the oneway clutches 29 are free from the gears 31. As a result, the insertion pinch roller 11 is over-driven (sped up) by the gearing of gears 32 and 33 in a clockwise direction. Thereby, the peripheral velocity of the insertion pinch roller 11 is larger than that of the platen 9, and the ejection pinch roller 10 is trailed to the platen 9.

Figure 4:
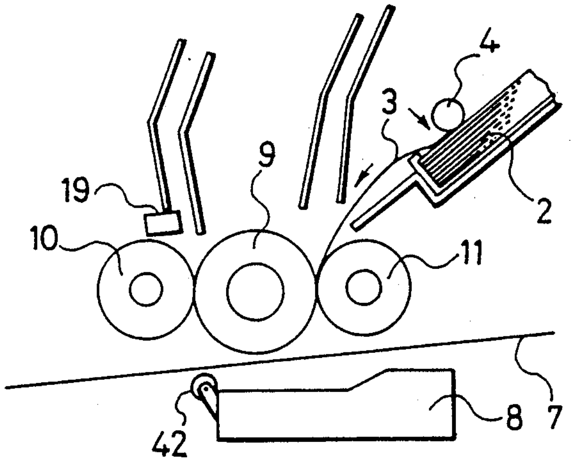
FIG. 4, FIG. 5, FIG. 6, FIG. 7 and FIG. 8 are side views showing motions of the main part of the thermal transcription printer shown in FIG. 1.

The image transcription operation is described as follows. In FIG. 4, under the condition that the thermal head 8 has been down, a paper sheet 3 is supplied from the cassette 2 to a position where the platen 9 and the insertion pinch roller 11 contact with each other by the paper supplying rollers 4.

Figure 5:
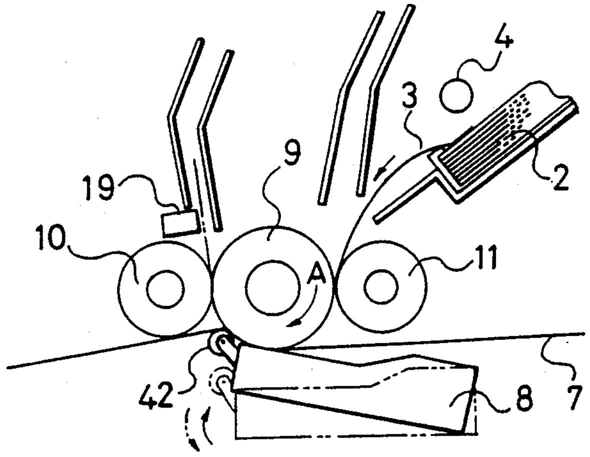

Next, in FIG. 5, when the thermal head 8 goes up and the platen 9 rotates in a clockwise direction shown by arrow A, the paper sheet 3 is sandwiched between the platen 9 and the ribbon 7. Then the paper sheet 3 is wound around the platen 9 and ejected from a position where the platen 9 and the ejection pinch roller 10 contact with each other. When the top end of the paper sheet 3 reaches to a position facing the sensor 19, the platen 9 ceases its rotation.

After that, when the thermal head 8 goes down as shown by two-dotted chainline, the platen 9 rotates in clockwise direction as shown by arrow A again and the paper sheet 3 is conveyed a predetermined length. At this time, as the ejection pinch roller 10 is over-driven, the conveying speed due to the ejection pinch roller 10 becomes larger than that due to the insertion pinch roller 11, and the looseness of the paper sheet 3 occurred in supply thereof is gradually removed.

Figure 6:
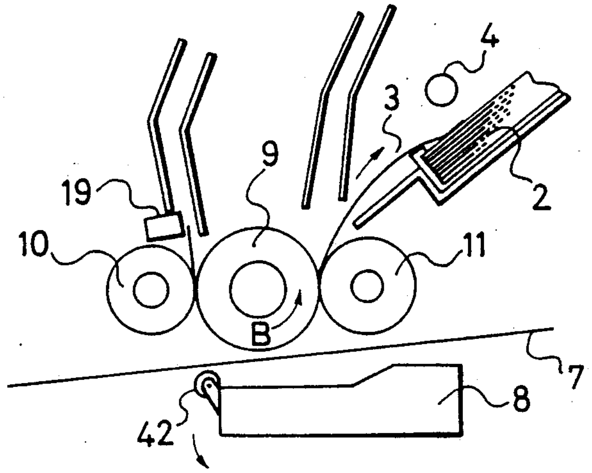

After that, in FIG. 6, the platen 9 is rotated in a counterclockwise direction shown by arrow B, for backwardly conveying the paper sheet 3 until the top of the paper sheet 3 reaches to the position facing the sensor 19. At this time, the insertion pinch roller 11 is over-driven. As a result, the conveying speed due to the insertion pinch roller 11 becomes larger than that due to the ejection pinch roller 10, and hence the looseness of the paper sheet 3 is removed and the paper sheet 3 closely adheres to the platen 9. By the above-mentioned processes, the paper sheet 3 is set to the thermal transcription printer, and the transcription of the image to the paper sheet 3 starts thereafter.

Figure 7:
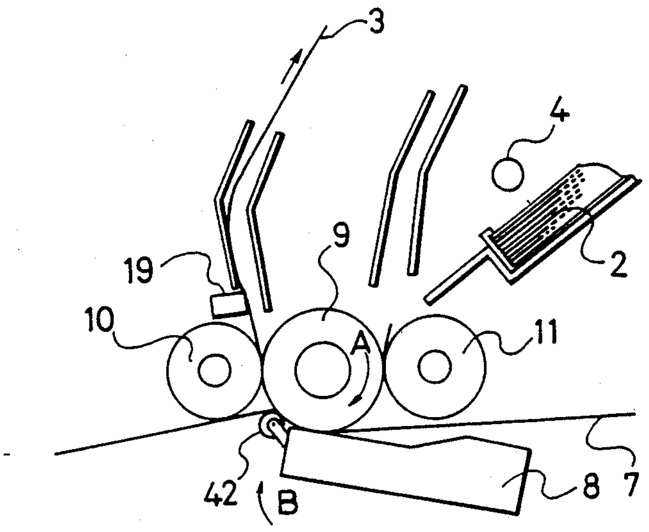

In FIG. 7, a first image transcription of a first color is started after rising up of the thermal head 8 and rotating the platen 9 in a clockwise direction shown by arrow A. Hereinafter, when the platen 9 rotates in the clockwise direction shown by arrow A, the ejection pinch roller 10 is over-driven and the insertion pinch roller 11 is trailed by the platen 9, and when the platen 9 rotates in the counterclockwise direction shown by arrow B, the insertion pinch roller 11 is over-driven and the ejection pinch roller 10 is trailed by the platen 9.

Figure 8:
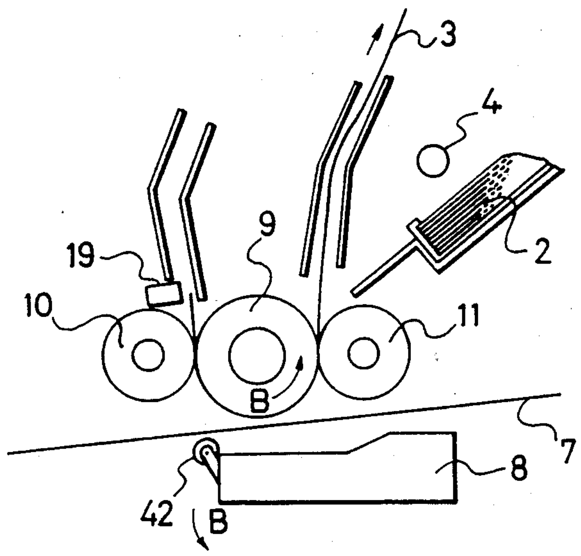

When the first image transcription is over, the thermal head 8 goes down, the platen 9 rotates in counterclockwise direction shown by arrow B as shown in FIG. 8. And the paper sheet 3 is conveyed backward until the top of the paper reaches to the position of facing to the sensor 19. After that, the processes shown in FIGS. 7 and 8 are alternately and plurally repeated for completing all the image transcription of colors.

Figure 11:
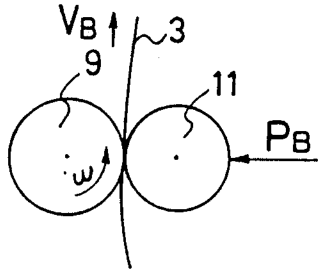

When all the transcriptions of predetermined colors are over, in FIG. 11, the thermal head 8 is put down, and the platen 9 stops its rotation. Then the paper sheet 3 is ejected to the stacker 26 by pressing of the pinch roller 18 to the ejection roller 17 and the rotation thereof.

In the above-mentioned embodiment, the pressure $P_B$ of the insertion pinch roller 11 and the pressure $P_F$ of the ejection pinch roller 10 in the image transcription process and the backward conveyance of the paper sheet 3 are shown respectively by the following inequalities.

$P_B$ in the image transcription process is in a range satisfying both of following inequalities $$\frac{P_H}{e^{\mu\theta}} < P_B < P_1 \text{, and}$$

$$P_2 < P_B < P_F \cdot e^{\mu\theta} \text{, and}$$

$P_F$ is in a range satisfying both of following inequalities $$P_2 < P_F < P_H \cdot e^{\mu\theta} \text{, and}$$

$$\frac{P_B}{e^{2\mu\theta}} < P_F < P_1 .$$

Therein:

$P_H$: pressure of the thermal head 8;

$P_1$: boundary pressure of trailed pinch roller only thereby the paper sheet 3 is pressed to the platen 9 so as to convey it around the platen 9 without any slippage by the rotation of the platen 9;

$P_2$: boundary pressure of over-driven pinch roller only thereby the paper sheet 3 is pressed to the platen 9 so as convey it around the platen 9 without any slippage by the rotation of the platen 9;

$\theta$: winding angle of the platen 9 for winding the paper sheet 3 between the contacting parts of the platen 9 and respective pinch rollers 10 and 11;

$\mu$: friction coefficient between the outside surface of the platen 9 and the paper sheet 3; and e: base of natural logarithm.

In the above-mentioned embodiment, the paper sheet 3 closely adheres to the platen 9 and is conveyed in accordance with the rotation of the platen 9 in forward conveyance (image transcription) operation and backward conveyance operation. Therefore, the looseness or slippage of the paper sheet 3 does not occur, and the error of the positioning of the paper in each image transcription operations does not occur. As a result, a clear color image having almost no color mis-registration is formed on the paper sheet 3.

The clear color image having almost no color mis-registration is formed by following principles.

Figure 9:
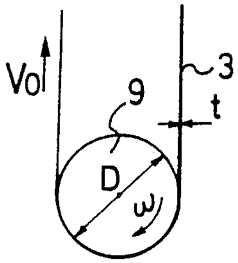
FIG. 9, FIG. 10, FIG. 11, FIG. 12, FIG. 13 and FIG. 14 are schematical side views showing the principles of the present invention.

In FIG. 9, when the paper sheet 3 is wound around the platen 9 with a prescribed tension and the slippage between the paper sheet 3 and the platen 9 does not occur, the conveying speed $V_O$ of the paper sheet 3 is generally provided by the following equation.

$$V_O = (1 + t/D) \cdot V_N .$$

Hereupon, "t" is a thickness of the paper sheet 3, "D" is a diameter of the platen 9, and "$V_N$" is a circumferential velocity of the platen 9. Defining "ω" as an angular velocity of the platen 9, the circumferential velocity $V_N$ is given by $$V_N = \frac{\omega \cdot D}{2} .$$

Figure 10:
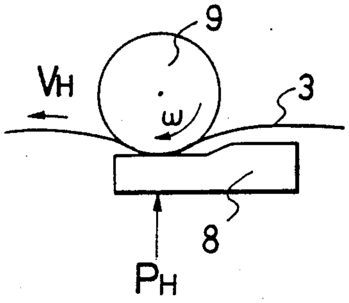

In FIG. 10, when the thermal head 8 presses the platen 9 for sandwiching the paper sheet 3, the conveying speed $V_H$ of the paper sheet 3 at a position where the thermal head 8 presses is affected by the pressure of the thermal head 8. The conveying speed $V_H$ when the paper sheet 3 is sandwiched between the thermal head 8 and the platen 9 with a necessary pressure for image transcribing (which is a rated pressure) is generally larger than $V_O$ due to the deformation of the platen 9 or the like.

Figure 15:
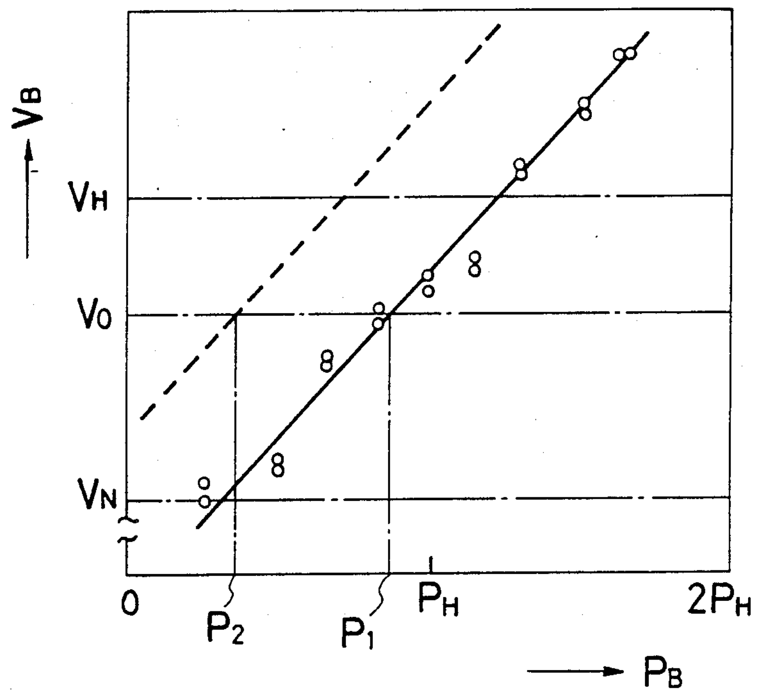
FIG. 15 and FIG. 16 are drawings showing characteristic curves of the paper during conveyance thereof in the first preferred embodiment of the present invention.

On the other hand, as shown in FIG. 11, the conveying speed $V_B$ of the paper sheet 3 increases in proportion to the increase of the pressure $P_B$ of the pinch roller 11 when the paper sheet 3 is pressed to the platen 9 by the pinch roller 11. FIG. 15 is a characteristic curve showing the examples of measured conveying speeds by a solid line. The abscissa of FIG. 15 shows the pressure $P_B$ of the pinch rollers and the ordinate shows the conveying speed $V_B$ of the paper sheet 3. For reference, values of $V_N$, $V_O$, $V_H$ and $P_1$ are shown in FIG. 15.

Figure 12:
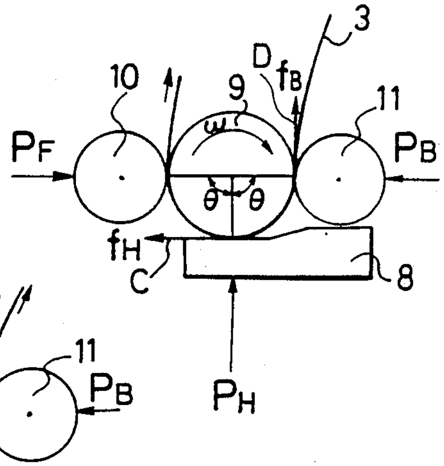

Hereupon, when the pressure $P_B$ of the insertion pinch roller 11 is smaller than the value $P_1$ shown in FIG. 15, the relations among the conveying speeds at each points in the image transcription are provided by the inequality of $$V_B < V_O < V_H$$

and the paper sheet 3 closely adheres to the platen 9 without any looseness. At this time, in FIG. 12, a conveying force $f_H$ due to the thermal head 15 acts in a horizontal direction shown by arrow C, at the position where the thermal head 8 presses the platen 9, and a restriction force $f_B$ acts in a vertical direction shown by arrow D at a position where the insertion pinch roller 11 presses the platen 9.

Figure 14:
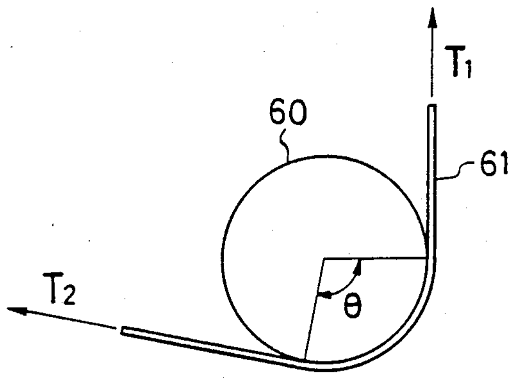

As shown in FIG. 14, when a flexible body 61 is wound around a fixed cylinder 60 taking a winding angle $\theta$, relations among tensions $T_1$ and $T_2$ of the flexible body 61 and a friction coefficient between the flexible body 61 and the outside surface of the cylinder 60 are generally given by the following inequalities.

(i) When an inequality of $$T_1 > T_2 \cdot e^{\mu\theta}$$

holds, the flexible body 61 slips in a direction shown by arrow $T_1$ on the outside surface of the cylinder 60.

(ii) When an inequality of $$T_1 < \frac{T_2}{e^{2\mu\theta}}$$

holds, the flexible body 61 slips in a direction shown by arrow $T_2$ on the outside surface of the cylinder 60.

(iii) When an inequality of $$\frac{T_2}{e^{\mu\theta}} < t_1 < T_2 \cdot e^{\mu\theta}$$

holds, the flexible body 61 is restricted on the outside surface of the cylinder 60 and any slippage can not occur.

When the above-mentioned relations are applied to the embodiment of the present invention, and "$\mu$" is a friction coefficient between the paper sheet 3 and the outside surface of the platen 9, and "$\theta$" is a winding angle by which the paper sheet 3 is to be wound to the platen 9, the following three cases are to be considered;

$$f_B > f_H \cdot e^{\mu\theta}; \tag{iv}$$

$$0 < f_B < \frac{f_H}{e^{\mu\theta}}; \text{ and} \tag{v}$$

$$\frac{f_H}{e^{\mu\theta}} < f_B < f_H \cdot e^{\mu\theta}. \tag{vi}$$

When $f_B$ is kept in a range shown by the inequality (vi), any slippage between the paper sheet 3 and the outside surface of the platen 9 may not occur.

On the other hand, the following equations $$f_H = \mu \cdot P_H; \text{ and}$$

$$f_B = \mu \cdot P_B$$

holds. Therefore, the relations among the pressures shown in the inequality (vi) can be rewritten to an inequality of $$\frac{P_H}{e^{\mu\theta}} < P_B < P_H \cdot e^{\mu\theta}$$

There is, however, an inequality of $$0 < \frac{P_H}{e^{\mu\theta}} < P_1 < P_H \cdot e^{\mu\theta}$$

holds in practice. Therefore, when the value of $P_B$ is in a range given by an inequality of $$\frac{P_H}{e^{\mu\theta}} < P_B < P_1,$$

the paper sheet 3 closely adheres to the platen 9 between the portions where the thermal head 8 and the insertion pinch roller 11 respectively contact to the platen 9, and any looseness or slippage may not occur therebetween. Therefore, the paper sheet 3 is conveyed in the conveying speed $V_O$ responding to the rotation of the outside surface of the platen 9.

At this time, it is necessary to prevent the occurrence of the looseness of the paper sheet 3 on the surface of the platen 9 between the thermal head 8 and the ejection pinch roller 10, by setting the conveying speed $V_F$ due to the ejection pinch roller 10 to be larger than the conveying speed $V_O$. Therefore, the pressure $P_F$ should be larger than $P_2$ shown in FIG. 18, and also it should be in a range shown by the following inequality of $$P_2 < P_F < P_H \cdot e^{\mu\theta}.$$

Next, in the backward conveyance of the paper sheet 3, the insertion pinch roller 11 is over-driven and the ejection pinch roller 10 is trailed by the platen 9. Therefore, the relations among the conveying speeds at each points become shown by the following inequality, by setting that $P_B$ is larger than $P_2$ and $P_F$ is smaller than $P_1$, $$V_f < V_O < V_B.$$

Figure 13:
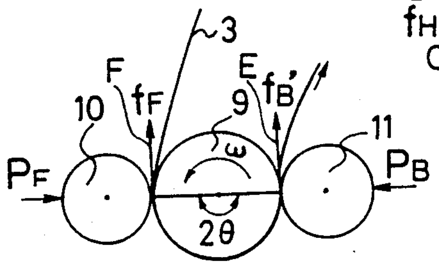

At this time, as shown in FIG. 13, a conveying force $F_B'$ due to the insertion pinch roller 11 acts in a direction shown by arrow E at a position where the insertion pinch roller 11 contacts with the platen 9, and the restriction force $f_F$ due to the ejection pinch roller 10 acts in a direction shown by arrow F at a position where the ejection pinch roller 10 contacts with the platen 9.

When the relation between the conveying force and the restriction force is shown by the following inequality of $$\frac{P_B}{e^{2\mu\theta}} < P_F < P_1, \text{ and}$$

$$P_2 < P_B < P_F \cdot e^{2\mu\theta},$$

similarly to the afore-mentioned image transcription case, the paper sheet 3 closely adheres the platen 9 between the insertion pinch roller 11 and the ejection pinch roller 10, so that any slippage between the platen 9 and the paper sheet 3 does not occur. Therefore, the paper sheet 3 is conveyed in the conveying speed $V_O$.

For reference, characteristic curve showing the relation between the pressure $P_B$ of the insertion pinch roller 11 and the conveying speed $V_S$ of the paper in the image transcription is shown by a solid line and that in the backward conveyance of the paper sheet 3 is shown by a dotted line in FIG. 15. Hereupon, in FIG. 15 the abscissa shows the pressure $P_B$ of the insertion pinch roller and the ordinate shows the conveying speed $V_S$ of the paper sheet 3. At this time, the pressure $P_F$ of the ejection pinch roller 10 is selected in a range given by the afore-mentioned inequality. When the pressure $P_B$ of the insertion pinch roller 11 is in a range given by the afore-mentioned inequality, the conveying speeds of the paper sheet 3 in the image transcription and in the backward conveyance of the paper sheet 3 become substantially equal to $V_O$, and a stable paper conveyance is achieved.

A second preferred embodiment of a thermal transcription printer in accordance with the present invention is described in the following. Here, the distinguishable feature from the afore-mentioned first embodiment is that the gearing apparatus consists of gears 31, 32 and 33 is reduction gear system as shown in FIG. 3(B), and the other features are substantially the same as the first embodiment. Therefore, the description of the common features are omitted.

In FIG. 3(B), when the platen 9 rotates in clockwise direction shown by arrow A, a sliding member of the oneway clutches 30 is fixed to the gears 32 and the insertion pinch roller 11 is driven in a speed reduced to a lower velocity by the gear ratio of the gears 32 and 33 than that of the platen 9. And also, a sliding member of the oneway clutches 29 is free from the gears 31 and the ejection pinch roller 10 is trailed by the platen 9.

In opposition, when the platen 9 rotates in counterclockwise direction shown by arrow B, the sliding member of the oneway clutches 29 is fixed to the gear 31 and the ejection pinch roller 10 is driven in a peripheral speed reduced to a lower velocity by the gear ratio of the gears 31 and 33 than that of the platen 9. And the sliding member of the oneway clutch 30 is free from the gears 32 and the insertion pinch roller 11 is trailed by the platen 9.

Figure 3:
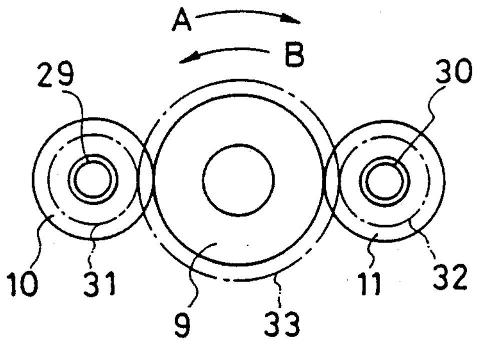
FIG. 3(A) is a schematic side view showing a gearing of a first preferred embodiment of the thermal transcription printer in accordance with the present invention.
FIG. 3(B) is a schematical side view showing a gearing of a second preferred embodiment of the thermal transcription printer in accordance with the present invention.
Figure 3:
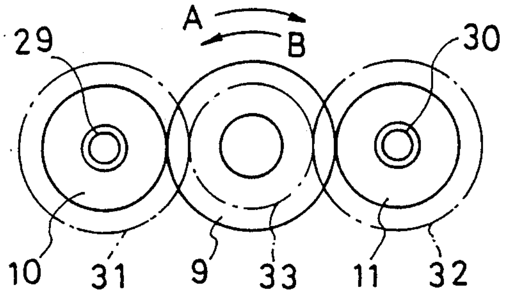

In FIG. 5, when the platen 9 rotates in clockwise direction shown by arrow A and thereby the paper sheet 3 is conveyed, the rotation speed of the insertion pinch roller 11 is reduced by gearing system of gears 32 and 33 (which are shown in FIGS. 1 and 3) and the ejection pinch roller 10 is trailed by the rotation of the platen 9. Namely, the peripheral velocity of the insertion pinch roller 11 is smaller than that of the platen 9 and the peripheral velocity of the ejection pinch roller 10 is equal to that of the platen 9. As a result, the paper conveying speed due to the ejection pinch roller 10 becomes larger than that due to the insertion pinch roller 11, and the looseness of the paper sheet 3 occurred in supply thereof is gradually removed.

After that, in FIG. 6, the platen 9 is rotated in a counterclockwise direction shown by arrow B, for backward conveying the paper sheet 3 until the top of the paper sheet 3 reaches to the position facing the sensor 19. At this time, the rotation speed of the ejection pinch roller 10 is reduced and the insertion pinch roller 11 is trailed by the platen 9. As a result, the conveying speed due to the insertion pinch roller 11 becomes larger than that due to the ejection pinch roller 10, and hence the looseness of the paper sheet 3 is removed and the paper sheet 3 closely adheres to the platen 9.

$P_B$ in the image transcription process is in a range satisfying both of following inequalities $$\frac{P_H}{e^{\mu\theta}} < P_B < P_2, \text{ and}$$

$$P_1 < P_B < P_F \cdot e^{\mu\theta}$$

In the second embodiment, $P_F$ is in a range satisfying both of following inequalities $$P_1 < P_F < P_H \cdot e^{\mu\theta}, \text{ and}$$

$$\frac{P_B}{e^{2\mu\theta}} < P_F < P_2.$$

Therein:

$P_H$: pressure of the thermal head 8;

$P_1$: boundary pressure of trailed pinch roller only thereby the paper sheet 3 is pressed to the platen 9 so as to convey it around the platen 9 without any slippage by the rotation of the platen 9;

$P_2$: boundary pressure of pinch roller, which rotation speed being reduced, only thereby the paper sheet 3 is pressed to the platen 9 so as convey it around the platen 9 without any slippage by the rotation of the platen 9;

$\theta$: winding angle of the platen 9 for winding the paper sheet 3 between the contacting parts of the platen 9 and respective pinch rollers 10 and 11;

$\mu$: friction coefficient between the outside surface of the platen 9 and the paper sheet 3; and e: base of natural logarithm.

Figure 16:
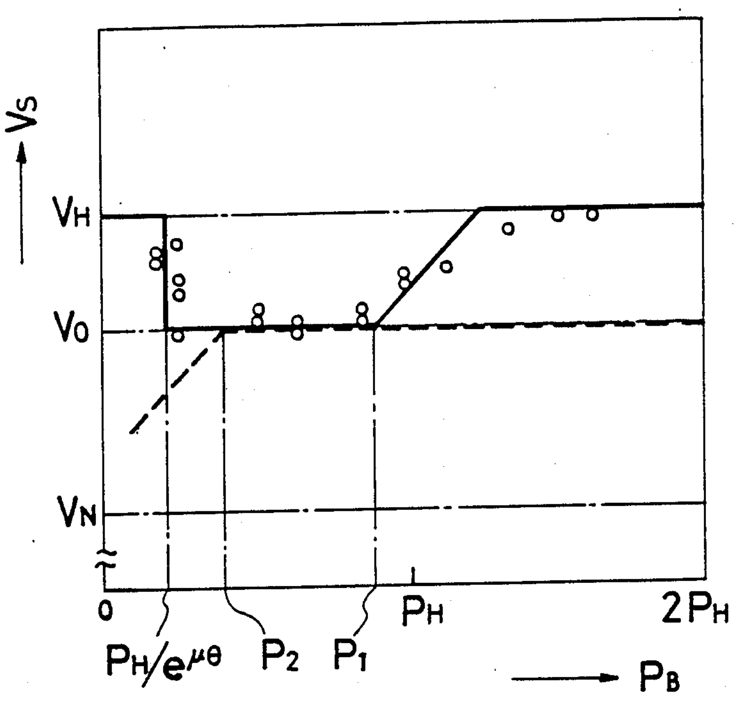
Figure 17:
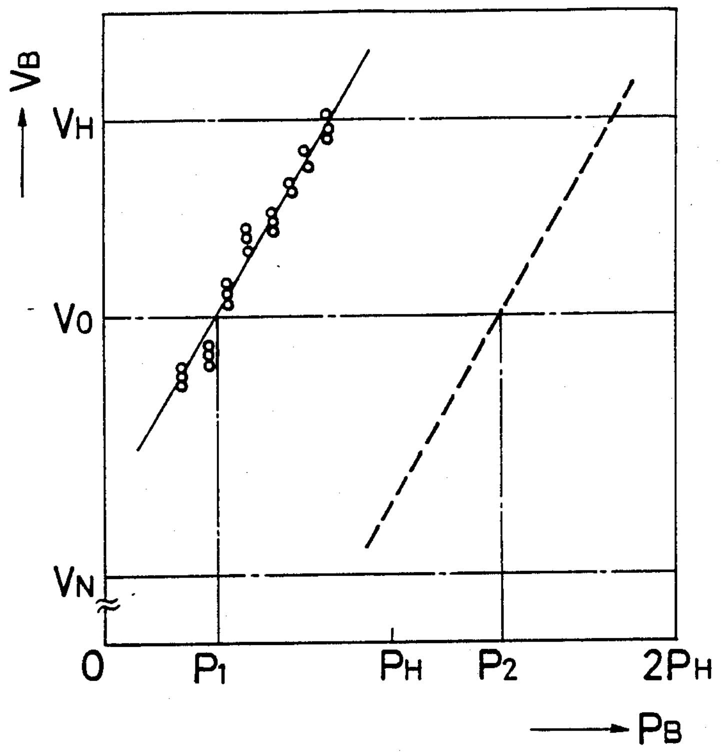
FIG. 17 and FIG. 18 are drawings showing characteristic curves of the paper during conveyance thereof in the second preferred embodiment of the present invention.
Figure 18:
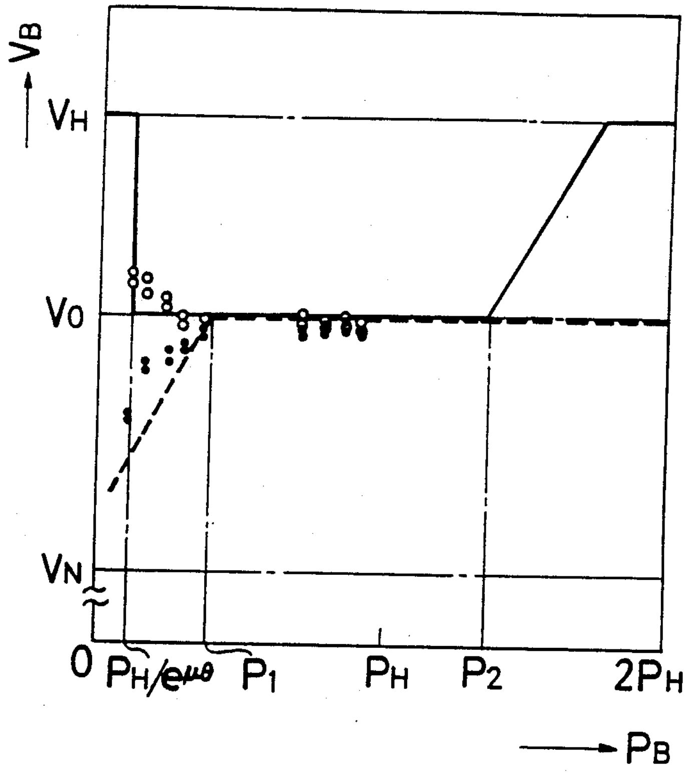
Figure 19:
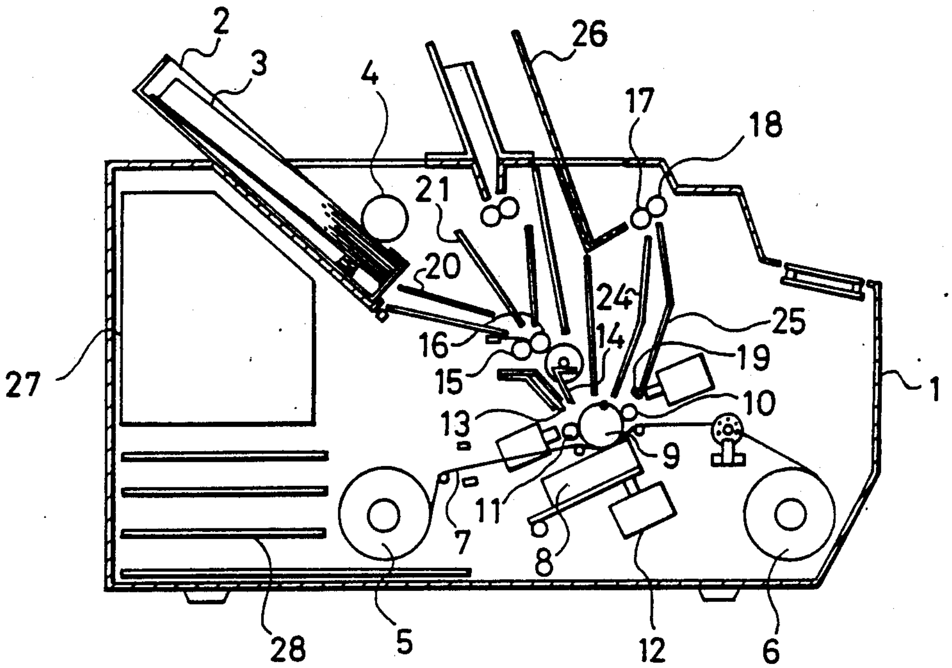
FIG.19 (Prior Art)
FIG. 19 is a cross-sectional side view showing a conventional thermal transcription printer.

Next, in the second embodiment, the characteristics of paper conveyance shown in FIG. 17 and FIG. 18 are replaced by the characteristics of the first embodiment shown in FIG. 15 and FIG. 16. Therefore, when the characteristics shown in FIG. 17 are applied to afore-mentioned FIG. 14, wherein a flexible body 61 is wound around a fixed cylinder 60 taking a winding angle $\theta$, an inequality of $$0 < \frac{P_H}{e^{\mu\theta}} < P_2 < P_H \cdot e^{\mu\theta}$$

holds in practice. Therefore, when the value of $P_B$ is in a range given by an inequality of $$\frac{P_H}{e^{\mu\theta}} < P_B < P_2,$$

the paper sheet 3 closely adheres to the platen 9 between the portions where the thermal head 8 and the insertion pinch roller 11 respectively contact to the platen 9, and any looseness or slippage may not occur therebetween.

In order to prevent the occurrence of the looseness of the paper sheet 3 on the surface of the platen 9 between the thermal head 8 and the ejection pinch roller 10, the pressure $P_F$ should be larger than $P_1$ shown in FIG. 16, and also it should be in a range shown by the following inequality of $$P_1 < P_F < P_H \cdot e^{\mu\theta}.$$

Next, in the backward conveyance of the paper sheet 3, the relations among the conveying speeds at each points become shown by the following inequality, by setting that $P_B$ is larger than $P_1$ in FIG. 16 and $P_F$ is smaller than $P_2$, $$V_f < V_O < V_B.$$

When the relation between the conveying force and the restirction force is shown by the following inequality of $$\frac{P_B}{e^{2\mu\theta}} < P_F < P_2,$$

$$P_1 < P_B < P_F \cdot e^{2\mu\theta}$$

similarly to the afore-mentioned image transcription case, the paper sheet 3 closely adheres the platen 9 between the insertion pinch roller 11 and the ejection pinch roller 10, so that any slippage between the platen 9 and the paper sheet 3 does not occur. Therefore, the paper sheet 3 is conveyed in the conveying speed $V_O$.

The above-mentioned embodiment is described for a case of an application to a multi-color thermal transcription printer. However, the same effects is obtainable when the present invention is applied to another type of printer.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A thermal transcription printer comprising:

a thermal head (8) for supplying heat energy to an ink ribbon (7) pressed on a paper (3) to be transcribed of an image:

a platen (9) whereon said paper is to be wound and is to be reciprocatably conveyed by clockwise and counterclockwise rotations of said platen;

rotation transmitting means (33) disposed on at least one side of a shaft (9a) of said platen for transmitting a rotation of said platen;

a pair of pinch rollers (10, 11) for providing pressing forces on an insertion side and an ejection side of said platen for pressing said paper to said platen;

pinch roller rotating means (31, 32) disposed on at least one side of shafts (10a, 11a) of respective pinch rollers (10, 11) and being geared with said rotation transmitting means for rotating said pinch rollers so that peripheral speeds of said pinch rollers are faster than that of said platen; and oneway clutches (29, 30) disposed on said shafts of said respective pinch rollers and coupled to said pinch roller rotating means so that one of said pair of pinch rollers located at a backward position with respect to a conveyance direction of said paper is trailed to said platen and the other one of said pair of pinch rollers located at a forward position with respect to the conveyance direction of said paper is over-driven at a peripheral speed which is faster than a peripheral speed of said platen.

2. A thermal transcription printer in accordance with claim 1, wherein a pressure ($P_B$) of one of said pinch rollers, which is disposed at a backward position and a pressure $P_F$ of the other of said pinch rollers, which is disposed at a forward position against said paper conveying direction in image transcription, are respectively in ranges given by inequalities of $$\frac{P_H}{e^{\mu\theta}} < P_B < P_1, \text{ and}$$

$$P_2 < P_B < P_F \cdot e^{\mu\theta},$$

in said image transcription and $$P_2 < P_F < P_H \cdot e^{\mu\theta}, \text{ and}$$

$$\frac{P_B}{e^{2\mu\theta}} < P_F < P_1$$

in backward conveyance of said paper; wherein $P_H$: pressure of said thermal head;

$P_1$: boundary pressure of trailed pinch roller whereby said paper is pressed to said platen for conveying said paper around said platen without any slippage by the rotation of said platen;

$P_2$: boundary pressure of over-driven pinch roller whereby said paper is pressed to said platen for conveying said paper around said platen without any slippage by the rotation of said platen;

$\theta$: winding angle of said platen for winding said paper between the contacting parts of said platen and respective pinch rollers;

$\mu$: friction coefficient between the outside surface of said platen and said paper; and e: base of natural logarithm.

3. A thermal transcription printer comprising:

a thermal head (8) for supplying heat energy to an ink ribbon (7) pressed on a paper to be transcribed of an image;

a platen (9) whereon said paper is to be wound and is to be reciprocatably conveyed by clockwise and counterclockwise rotation of said platen;

rotation transmitting means (33) disposed on at least one side of a shaft (9a) of said platen for transmitting a rotation of said platen;

a pair of pinch rollers (10, 11) for providing pressing forces on an insertion side and an ejection side of said platen for pressing said paper to said platen;

pinch roller rotating means (31, 32) disposed on at least one side of shafts (10a, 11a) of respective pinch rollers and being geared with said rotation transmitting means for rotating said pinch rollers so that peripheral speeds of said pinch rollers are slower than that of said platen; and oneway clutches (29, 30) disposed on said shafts of respective pinch rollers and coupled to said pinch roller rotating means so that one of said pair of pinch rollers at forward position with respect to a conveyance direction of said paper is trailed to said platen and the other one of said pair of rollers at a backward position with respect to the conveyance direction of said paper is driven at a peripheral speed which is lower than a peripheral speed of said platen.

4. A thermal transcription printer in accordance with claim 3, wherein a pressure ($P_B$) of one of said pinch rollers, which is disposed at a backward position and a pressure $P_F$ of the other of said pinch rollers, which is disposed at a forward position against said paper conveying direction in image transcription, are respectively in ranges given by inequalities of $$\frac{P_H}{e^{\mu\theta}} < P_B < P_2\text{, and}$$

-continued $$P_1 < P_B < P_F \cdot e^{\mu\theta}\text{,}$$

in said image transcription and $$P_1 < P_F < P_H \cdot e^{\mu\theta}\text{, and}$$

$$\frac{e^{2\mu\theta}}{P_B} < P_F < P_1$$

in backward conveyance of said paper; wherein $P_H$: pressure of said thermal head;

$P_1$: boundary pressure of trailed pinch roller whereby said paper is pressed to said platen for conveying said paper around said platen without any slippage by the rotation of said platen;

$P_2$: boundary pressure of pinch roller whose peripheral speed is reduced, whereby said paper is pressed to said platen for conveying said paper around said platen without any slippage by the rotation of said platen;

$\theta$: winding angle of said platen for winding said paper between the contracting parts of said platen and respective pinch rollers;

$\mu$: friction coefficient between the outside surface of said platen and said paper; and

* * * * *